United States Patent

Hoffman, Jr.

[15] 3,645,697
[45] Feb. 29, 1972

[54] CONTROLLING APPARATUS OF A REACTOR

[72] Inventor: Alfred A. Hoffman, Jr., Bartlesville, Okla.
[73] Assignee: Phillips Petroleum Company
[22] Filed: July 18, 1969
[21] Appl. No.: 843,158

[52] U.S. Cl. ........................23/253 A, 23/230 A, 23/1 B, 165/12, 165/30, 165/36, 165/39, 137/2, 137/90, 222/52, 260/700
[51] Int. Cl. ........................G01n 25/42
[58] Field of Search ..............23/253, 1 B; 165/2, 11, 12, 165/30, 36, 39, 40

[56] References Cited
UNITED STATES PATENTS

| | | | |
|---|---|---|---|
| 2,788,264 | 4/1957 | Bremer et al. | 23/1 B X |
| 2,909,413 | 10/1959 | Hildyard | 23/253 UX |
| 2,974,017 | 3/1961 | Morgan | 23/253 |

Primary Examiner—James H. Tayman, Jr.
Attorney—Young and Quigg

[57] ABSTRACT

A batch reactor is controlled by measuring heat transfer to or from the reactor and integrating the measured signal. When the integrated signal reaches a preselected value, the reaction is terminated. The integrated signal can also be used to control introduction of a reactant.

5 Claims, 1 Drawing Figure

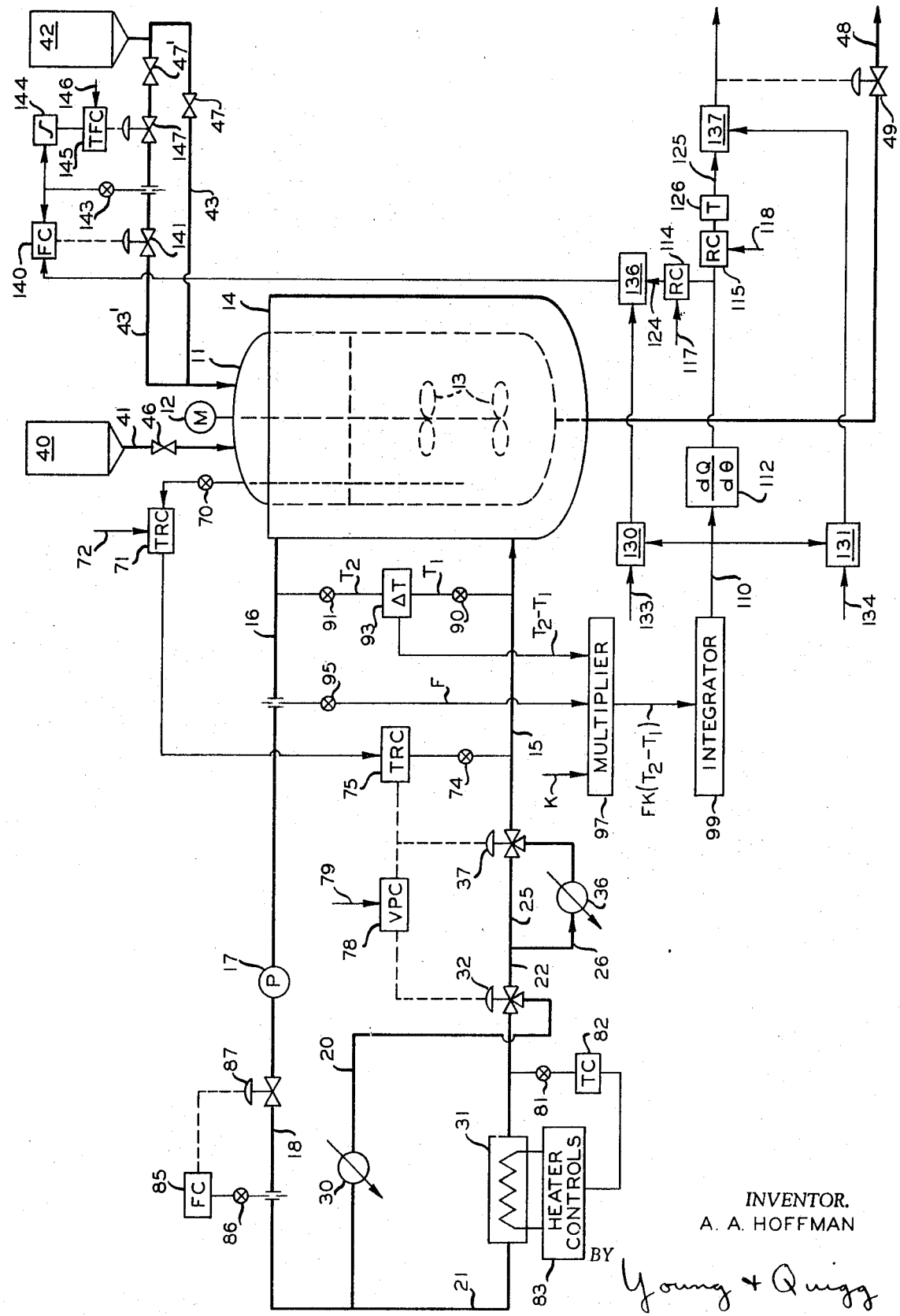

CONTROLLING APPARATUS OF A REACTOR

It is common practice in the chemical industry to carry out various chemical reactions in batch reactors. In order to obtain maximum production of specification product, it is usually necessary to control quite accurately both the rate of addition of reactants and the termination time of the reaction. While automatic control can be based on a predetermined time sequence, process variations cannot be corrected during individual reactions by this procedure. Another possible control method involves periodic removal of samples from the reactor for analysis. However, certain reactants cannot be analyzed rapidly so that control systems based on analyses are not always practical.

In accordance with the present invention, a control system is provided which is capable of determining automatically the rate at which a chemical reaction takes place and the time at which the reaction is completed. This control is based on a measurement of the rate at which heat is liberated in an exothermic reaction or the rate at which heat is absorbed in an endothermic reaction. The heat transfer can be measured by determining the rate of flow of a fluid passed in heat exchange relationship with the reactor and the temperature differential of the heat exchange fluid upon entering and leaving the reactor. From these measurements, an integrated signal is obtained which represents the cumulative heat change in the reactor, which is indicative of the degree of completion of the reaction. This signal can be differentiated to provide a control signal. This latter signal is independent of minor fluctuations in the heat exchange rate. In response to these signals, the reactor can be controlled by adjusting the rate of addition of one or more reactants, and the reaction can be terminated at the proper time.

The accompanying drawing is a schematic representation of an embodiment of the control system of this invention.

In order to describe the control system of this invention, reference will be made to a particular reaction for the production of polyphenylene sulfide. This polymer is produced by reacting dichlorobenzene with partially hydrated sodium monosulfide in a batch reactor. The reaction is exothermic with a heat of reaction of approximately 1200 Btu's per pound of polymer produced.

Referring now to the drawing in detail, there is shown a reactor 11 which is provided with a jacket 14 through which a heat exchange medium can be circulated. Reactor 11 is provided with agitation means such as a stirrer 13 which is rotated by a motor 12. A heat exchange medium is introduced into jacket 14 through a conduit 15 and is removed through a conduit 16. The heat exchange medium is directed by a pump 17 from conduit 16 through a conduit 18 which is connected to parallel conduits 20 and 21, the latter joining a conduit 22 at a valve 32. Parallel conduits 25 and 26 connect conduit 22 to inlet conduit 15 at a valve 37. Heat exchange medium is thus circulated in a closed loop which includes jacket 14.

Cooling means 30 and 36 are disposed in respective conduits 20 and 26, and a heater 31 is disposed in conduit 21. The temperature of the heat exchange medium introduced into jacket 14 can thus be regulated by manipulation of valves 32 and 37 to control the relative flows through the cooling and heating means.

Dichlorobenzene is introduced into reactor 11 from a storage vessel 40 which is connected to the reactor by a conduit 41 which has a valve 46 therein. Partially hydrated sodium monosulfide is introduced into reactor 11 from a storage vessel 42 which is connected to the reactor by a conduit 43 which has a valve 47 therein. At the beginning of a reaction cycle, valves 46 and 47 are opened to introduce predetermined quantities of the reactants into reactor 11. Product can be removed from reactor 11 through an outlet conduit 48 which has a valve 49 therein.

A first temperature sensing element is positioned within reactor 11 to measure the temperature of the reaction medium. This sensing element is connected to a transducer 70 which transmits a signal representative of the measured temperature to a temperature controller 71. A set point signal 72, representative of the desired reaction temperature, is also applied to the temperature controller. The output signal from controller 71, which is representative of any difference between the measured signal and the set point signal, is transmitted as a set point signal to a second temperature controller 75. A second temperature sensing element is positioned to measure the temperature of fluid in conduit 15. This sensing element is connected to a transducer 74 which transmits a signal representative of the measured temperature to controller 75. The output signal from controller 75, which is representative of the difference between the two input signals, is applied to valve 37 to adjust the relative flows through conduits 25 and 26. The output signal from controller 75 is also applied as the input signal to a valve position controller 78. Controller 78 receives a set point signal 79. The output signal from controller 78, which is representative of the difference between the two input signals, is applied to valve 32 to control the relative flows through conduits 20 and 21. The flow of heat exchange medium through the closed loop is maintained at a predetermined rate by a flow controller 85 which adjusts a valve 87 in conduit 18 in response to a signal from a transducer 86 which senses the rate of flow through conduit 18.

As previously mentioned, the production of polyphenylene sulfide is an exothermic reaction. However, it is necessary to elevate the temperature of the reactants to at least 400° F before the reaction will commence. At the beginning of the cycle, the reactants are normally introduced into reactor 11 at a temperature of approximately 350° F. In order to start the reaction, warm heat exchange medium is circulated through jacket 14. At this time, the signal transmitted by transducer 70 is representative of a relatively low temperature within the reactor. The output signal from controller 75 is such that valves 32 and 37 are positioned so that all or at least a major portion of the heat exchange medium flows through heater 31. This serves to elevate the temperature of the reactor and start the reaction. As the reaction temperature rises, it is necessary to convert from heating the reactor to cooling the reactor in order to control the exothermic reaction. As the measured temperature within the reactor increases, the set point to controller 75 changes so that valves 32 and 37 are adjusted to direct more of the heat exchange medium through coolers 30 and 36. In this manner, the temperature of the reactor can be maintained at a desired set point valve during the reaction period, which may be of the order of several hours. The reaction is advantageously carried out at a temperature of approximately 475° F.

A temperature sensing element is disposed in conduit 21 downstream of heater 31 to measure the temperature of the heated exchange medium. This sensing element is connected to a transducer 81 which transmits a signal representative of the measured temperature to a temperature controller 82. Controller 82 regulates a suitable heater control 83 in order to prevent overheating of the exchange medium, particularly during the time that there is a low-flow rate through conduit 21.

In order to measure the rate of polymer production and to determine the time at which the reaction is completed, signals are established which are representative of the temperatures of the heat exchange medium flowing into and out of reactor 11 and the rate of flow of this heat exchange medium. To this end, a first temperature sensing element is positioned in conduit 15 adjacent jacket 14. This sensing element is connected to a transducer 90 which transmits a signal $T_1$ representative of the measured temperature to a differential temperature transmitter 93. Similarly, a transducer 91 transmits a signal $T_2$ which is representative of the temperature of the heat exchange medium removed through conduit 16. A resulting signal representative of the quantity $(T_2-T_1)$ is transmitted as the first input to a multiplier 97. A flow transducer 95 transmits a signal F to the second input of multiplier 97. Signal F is representative of the rate of flow of heat exchange medium through conduit 16. Multiplier 97 multiplies the two input signals and multiplies the resulting product by a constant input signal K which is representative of the specific heat of the heat exchange medium. The resulting signal $FK(T_2-T_1)$ is transmitted to the input of an integrator 99. Integrator 99 establishes an integrated output signal 110. Integrator 99 normally is set to begin integration at the start of the reaction cycle. Signal 110 is transmitted to a differentiating means 112 which establishes an output signal $d\theta/d\theta$ that represents the derivative of the integrated signal with respect to time. This signal is transmitted to the inputs of respective controllers 114 and 115.

Controllers 114 and 115 are provided with respective set point signals 117 and 118. The output signal 124 of controller 114, which is representative of the difference between the two input signals to the controller, is applied to a gate 136. When the gate is open, signal 124 is transmitted to a flow controller 140 which adjusts a valve 141 in a conduit 43'. Conduit 43' extends from vessel 42 to the inlet of reactor 11. The output signal 110 of integrator 99 is also transmitted to a controller 130 which acts in an "on-off" manner. Controller 130, which receives a set point signal 133, establishes an output signal which opens gate 136 when a predetermined relationship exists between the two input signals to controller 130, as described hereinafter in greater detail. In a similar fashion, the output signal from controller 115 is applied to a timer 126. The signal 125 from timer 126 is applied through a gate 137 to control valve 49. This signal can also sound an alarm to alert operator. Gate 137 is controlled by a controller 131 which is similar to controller 130. Controller 131 receives signal 110 and a set point signal 134.

As previously mentioned, reactant initially is supplied from vessel 42 through conduit 43. This is accomplished by opening valve 47 for a predetermined period. Thereafter, valve 47 is closed. However, additional reactant can subsequently be supplied through conduit 43'. At the beginning of the reaction, integrator 99 is placed in operation to measure the exothermic heat of reaction. Initially, heat is supplied to the reactor so that there is a negative, or zero, signal to the integrator. At the beginning of the reaction period, gate 136 is closed so that there is no signal transmitted to flow controller 140. Valve 141 remains closed at this time. The nature of the reaction is such that the production of polymer can be increased by adding additional reactant from vessel 42. This addition is controlled by the output signal from differentiating means 112 which is applied through controller 114 to controller 140. The second input signal to controller 140 is from a flow transducer 143. The set point of controller 130 is such that gate 136 is permitted to open only after the reaction has progressed by a preselected amount, as indicated by the output signal from integrator 99. This prevents premature addition of additional reactant.

It is normally desirable to limit the amount of reactant supplied from vessel 42 during the course of the reaction. This is accomplished by flow transducer 143 transmitting a signal through an integrator 144 to a flow controller 145 which receives a set point signal 146. Controller 145 serves to close valve 147 permanently when the total flow through conduit 43' reaches a predetermined amount beyond the original reactant 42 charge, as measured by the output signal from integrator 144.

At the start of the reaction cycle the temperature builds up to the desired reaction temperature. The actual rate of reaction is measured by the signal $d\theta/d\theta$. When this signal reaches a predetermined value, a signal is transmitted through controller 115 to start timer 126. Timer 126 is set to provide an output signal at the end of a predetermined time interval. This signal is applied through gate 137 to open valve 49, thereby draining the reactor. Controller 131 is provided with a set point such that gate 137 remains closed until the reaction has proceeded to a specified level. This prevents the accidental opening of valve 49 in the event that the signal from 112 should start the timer production prematurely. Although not illustrated, the output signal from controller 137 can be employed to initiate a new cycle by manipulation of valves 46 and 47.

As a specific example of the control system of this invention, 4910 pounds of dichlorobenzene at about 385° F are introduced into reactor 11 from vessel 40. Then 3,160 pounds of $Na_2S \cdot 1.5H_2O$ are introduced from vessel 42, together with 9,960 pounds of N-methyl-2-pyrrolidone. These materials are at an initial temperature of about 385° F. Hot oil is circulated through jacket 14 to elevate the temperature of the reactants. The reaction starts when the temperature reaches 420° F. The temperature of the reaction medium is permitted to rise until a temperature of about 475° F is reached. This normally takes some 1 to 3 hours. It is desirable to reach 475° F as soon as possible, while still maintaining sufficient control to prevent a reactor temperature instability. The temperature of the heat exchange medium is regulated by the illustrated control system to maintain a reaction temperature of 475° F. After reaching 475° F, the reaction is permitted to proceed for about 4 hours at this temperature. During this 4 hour period, an additional 260 pounds of the $Na_2S \cdot 1.5H_2O$ are added at a relatively uniform rate through conduit 43'. At the end of the 4 hour period, valve 49 is opened to dump the reactor.

While the invention has been described in conjunction with the production of polyphenylene sulfide for purpose of illustration, it is by no means limited to this reaction. In some control systems, the flow of more than one reactant can be adjusted by the computed production rate signal. In some systems, timer 126 can be eliminated and the control of reaction completion can be initiated when the signal $d\theta/d\theta$ falls below a preselected set point value. Thus, while the invention has been described in conjunction with a presently preferred embodiment, it obviously is not limited thereto.

What is claimed is:

1. A control system for a batch reactor with a heat exchanger having heating medium inlet and outlet conduits associated therewith, comprising:

a first temperature sensing element connected to the inlet conduit adjacent the heat exchanger for sensing the temperature of the heating medium passing through said conduit;

a second temperature sensing element connected to the outlet conduit adjacent the heat exchanger for sensing the temperature of the heating medium passing through said conduit;

a flow measuring element associated with the outlet conduit for measuring the flow rate of the heating medium discharging from the heat exchanger;

a first temperature transducer connected to the first temperature sensing element for delivering a signal ($T_1$) representative of the measured temperature;

a second temperature transducer connected to the second temperature sensing element for delivering a signal ($T_2$) representative of the measured temperature;

a differential temperature transducer connected to the first and second temperature transducers for receiving the signals ($T_1$ and $T_2$) therefrom, calculating the difference between said received signals, and delivering a resultant signal representative of said calculated difference;

a flow transducer connected to the flow measuring element for delivering a signal (F) representative of the measured flow rate;

a multiplying element connected to the differential temperature transducer and the flow transducer and having a set point K for receiving the signals, multiplying the signals, multiplying the product times the set point K, and delivering a signal $FK(\Delta T)$ responsive to said multiplications;

an integrating element connected to the multiplying element for receiving the signal $FK(\Delta T)$, integrating said signal, and delivering a signal representative of said integration;

a differentiating means connected to the integrating element for receiving the integrated signal therefrom and delivering an output signal representative of the derivation of the integrated signal with respect to time; and means responsive to said output signal to control the operation of said reactor to terminate a reaction therein when the reaction has been carried out to a preselected degree of completion as measured by said output signal.

2. The control system of claim 1, further comprising means responsive to said second signal to control the rate of addition of at least one reactant to said reactor.

3. The control system of claim 1 wherein said means to control includes a timing means actuated by said output signal of the differentiating means, said timing means establishing a time signal at a predetermined time interval after said timing means is actuated, said time signal being employed to control the operation of said reactor.

4. The control system of claim 1, further comprising a gate connected between said differentiating means and said means to control, and means responsive to said integrated signal to open said gate when said integrated signal is of preselected magnitude.

5. The control system of claim 1, further comprising first and second gates, each actuated by said integrated signal, said first gate being included within said means to control the operation of said reactor to permit said means to control to operate when said integrated signal reaches a preselected magnitude, and further comprising means to control the introduction of at least one reactant into said reactor, said last-mentioned means being actuated by said second gate when said integrated signal reaches a preselected magnitude.

* * * * *